(12) United States Patent
Jou

(10) Patent No.: US 7,333,465 B2
(45) Date of Patent: *Feb. 19, 2008

(54) METHOD AND APPARATUS FOR TRANSMITTING AND RECEIVING HIGH SPEED DATA IN A CDMA COMMUNICATION SYSTEM USING MULTIPLE CARRIERS

(75) Inventor: Yu-Cheun Jou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 716 days.

This patent is subject to a terminal disclaimer.

(21) Appl. No.: 10/062,133

(22) Filed: Jan. 30, 2002

(65) Prior Publication Data

US 2002/0122398 A1    Sep. 5, 2002

(51) Int. Cl.
*H04B 7/216* (2006.01)

(52) U.S. Cl. .................................. 370/342; 370/543

(58) Field of Classification Search ................ 370/342, 370/465, 479, 482, 543, 207, 481, 542
See application file for complete search history.

(56) References Cited

U.S. PATENT DOCUMENTS

| 4,135,059 A | 1/1979 | Schmidt ................... 179/15 |
| 4,256,925 A | 3/1981 | Goode ....................... 370/104 |
| 4,291,409 A | 9/1981 | Weinberg et al. .............. 375/1 |
| 4,319,353 A | 3/1982 | Alvarez, III et al. ........ 358/133 |
| 4,322,845 A | 3/1982 | Fennel, Jr. et al. .......... 370/104 |
| 4,339,818 A | 7/1982 | Gruenberg .................. 370/112 |
| 4,455,649 A | 6/1984 | Esteban et al. ............... 370/80 |
| 4,477,900 A | 10/1984 | Gruenberg .................. 370/112 |
| 4,491,947 A | 1/1985 | Frank ......................... 370/94 |
| 4,494,232 A | 1/1985 | Dambrackas et al. ......... 370/80 |
| 4,547,880 A | 10/1985 | De Vita et al. ............... 370/91 |
| 4,562,572 A | 12/1985 | Goldman et al. ............. 370/80 |
| 4,587,652 A | 5/1986 | Goldman ................. 370/110.1 |
| 4,594,476 A | 6/1986 | Freeman .................... 179/6.08 |
| 4,870,642 A | 9/1989 | Nohara et al. ................ 370/75 |
| 4,970,648 A | 11/1990 | Capots .................. 364/424.06 |

(Continued)

FOREIGN PATENT DOCUMENTS

EP    0044592    1/1982

(Continued)

OTHER PUBLICATIONS

Chen, et al. Multicarrier CDMA with Adaptive Frequency Hopping for Mobile Radio Systems: IEEE J. on Selected Areas in Communications 14(9): 1852-1858 (1996).

*Primary Examiner*—Chi Pham
*Assistant Examiner*—Kevin Mew
(74) *Attorney, Agent, or Firm*—David J. Huffaker; Kenneth K. Vu; Thomas Rouse

(57) ABSTRACT

The present invention is a novel and improved method and apparatus for transmitting data in a multiple carrier CDMA communication system. In the first implementation of the present invention, the data is encoded and the resulting encoded symbols are divided up and transmitted on different frequencies. The encoded symbols are provided to a symbol repetition means which keeps the symbol rate of data to be transmitted fixed. In a second embodiment, no symbol repetition is provided and variable length Walsh sequences are used to handle data rate variations.

15 Claims, 6 Drawing Sheets

U.S. PATENT DOCUMENTS

| | | | |
|---|---|---|---|
| 5,003,534 A | 3/1991 | Gerhardt et al. | 370/94 |
| 5,121,383 A | 6/1992 | Golestani | 370/60 |
| 5,168,575 A | 12/1992 | Cizek et al. | 455/33.1 |
| 5,276,730 A | 1/1994 | Cimini, Jr. et al. | 379/60 |
| 5,305,308 A | 4/1994 | English et al. | 370/32.1 |
| 5,349,580 A | 9/1994 | Hester et al. | 370/84 |
| 5,410,538 A | 4/1995 | Roche et al. | 370/18 |
| 5,608,725 A | 3/1997 | Grube et al. | 370/338 |
| 5,734,967 A * | 3/1998 | Kotzin et al. | 455/63.1 |
| 5,761,634 A * | 6/1998 | Stewart et al. | 704/220 |
| 5,790,588 A * | 8/1998 | Fukawa et al. | 375/148 |
| 6,141,353 A * | 10/2000 | Li | 370/465 |
| 6,172,994 B1 | 1/2001 | Schaffner et al. | 370/529 |
| 6,222,828 B1 * | 4/2001 | Ohlson et al. | 370/320 |
| 6,389,000 B1 * | 5/2002 | Jou | 370/342 |
| 6,400,703 B1 * | 6/2002 | Park et al. | 370/342 |
| 2001/0009545 A1 * | 7/2001 | Schilling | 370/342 |
| 2001/0038674 A1 * | 11/2001 | Trans | 375/355 |
| 2002/0009096 A1 * | 1/2002 | Odenwalder | 370/441 |
| 2004/0223536 A1 * | 11/2004 | Schilling | 375/145 |

FOREIGN PATENT DOCUMENTS

| | | |
|---|---|---|
| EP | 0412583 | 2/1991 |
| EP | 0418865 | 3/1991 |
| GB | 2022365 | 12/1979 |
| GB | 2182528 | 5/1987 |
| WO | 9107030 | 5/1991 |
| WO | 9627250 | 9/1996 |

* cited by examiner

FIG. 4A

| WALSH FUNCTION INDEX | WALSH CHIP WITHIN A WALSH FUNCTION | | | | | | | | | | | | | | | |
|---|---|---|---|---|---|---|---|---|---|---|---|---|---|---|---|---|
| | 0123 | 4567 | 11<br>8901 | 1111<br>2345 | 1111<br>6789 | 2222<br>0123 | 2222<br>4567 | 2233<br>8901 | 3333<br>2345 | 3333<br>6789 | 4444<br>0123 | 4444<br>4567 | 4455<br>8901 | 5555<br>2345 | 5555<br>6789 | 6666<br>0123 |
| 0 | 0000 | 0000 | 0000 | 0000 | 0000 | 0000 | 0000 | 0000 | 0000 | 0000 | 0000 | 0000 | 0000 | 0000 | 0000 | 0000 |
| 1 | 0101 | 0101 | 0101 | 0101 | 0101 | 0101 | 0101 | 0101 | 0101 | 0101 | 0101 | 0101 | 0101 | 0101 | 0101 | 0101 |
| 2 | 0011 | 0011 | 0011 | 0011 | 0011 | 0011 | 0011 | 0011 | 0011 | 0011 | 0011 | 0011 | 0011 | 0011 | 0011 | 0011 |
| 3 | 0110 | 0110 | 0110 | 0110 | 0110 | 0110 | 0110 | 0110 | 0110 | 0110 | 0110 | 0110 | 0110 | 0110 | 0110 | 0110 |
| 4 | 0000 | 1111 | 0000 | 1111 | 0000 | 1111 | 0000 | 1111 | 0000 | 1111 | 0000 | 1111 | 0000 | 1111 | 0000 | 1111 |
| 5 | 0101 | 1010 | 0101 | 1010 | 0101 | 1010 | 0101 | 1010 | 0101 | 1010 | 0101 | 1010 | 0101 | 1010 | 0101 | 1010 |
| 6 | 0011 | 1100 | 0011 | 1100 | 0011 | 1100 | 0011 | 1100 | 0011 | 1100 | 0011 | 1100 | 0011 | 1100 | 0011 | 1100 |
| 7 | 0110 | 1001 | 0110 | 1001 | 0110 | 1001 | 0110 | 1001 | 0110 | 1001 | 0110 | 1001 | 0110 | 1001 | 0110 | 1001 |
| 8 | 0000 | 0000 | 1111 | 1111 | 0000 | 0000 | 1111 | 1111 | 0000 | 0000 | 1111 | 1111 | 0000 | 0000 | 1111 | 1111 |
| 9 | 0101 | 0101 | 1010 | 1010 | 0101 | 0101 | 1010 | 1010 | 0101 | 0101 | 1010 | 1010 | 0101 | 0101 | 1010 | 1010 |
| 10 | 0011 | 0011 | 1100 | 1100 | 0011 | 0011 | 1100 | 1100 | 0011 | 0011 | 1100 | 1100 | 0011 | 0011 | 1100 | 1100 |
| 11 | 0110 | 0110 | 1001 | 1001 | 0110 | 0110 | 1001 | 1001 | 0110 | 0110 | 1001 | 1001 | 0110 | 0110 | 1001 | 1001 |
| 12 | 0000 | 1111 | 1111 | 0000 | 0000 | 1111 | 1111 | 0000 | 0000 | 1111 | 1111 | 0000 | 0000 | 1111 | 1111 | 0000 |
| 13 | 0101 | 1010 | 1010 | 0101 | 0101 | 1010 | 1010 | 0101 | 0101 | 1010 | 1010 | 0101 | 0101 | 1010 | 1010 | 0101 |
| 14 | 0011 | 1100 | 1100 | 0011 | 0011 | 1100 | 1100 | 0011 | 0011 | 1100 | 1100 | 0011 | 0011 | 1100 | 1100 | 0011 |
| 15 | 0110 | 1001 | 1001 | 0110 | 0110 | 1001 | 1001 | 0110 | 0110 | 1001 | 1001 | 0110 | 0110 | 1001 | 1001 | 0110 |
| 16 | 0000 | 0000 | 0000 | 0000 | 1111 | 1111 | 1111 | 1111 | 0000 | 0000 | 0000 | 0000 | 1111 | 1111 | 1111 | 1111 |
| 17 | 0101 | 0101 | 0101 | 0101 | 1010 | 1010 | 1010 | 1010 | 0101 | 0101 | 0101 | 0101 | 1010 | 1010 | 1010 | 1010 |
| 18 | 0011 | 0011 | 0011 | 0011 | 1100 | 1100 | 1100 | 1100 | 0011 | 0011 | 0011 | 0011 | 1100 | 1100 | 1100 | 1100 |
| 19 | 0110 | 0110 | 0110 | 0110 | 1001 | 1001 | 1001 | 1001 | 0110 | 0110 | 0110 | 0110 | 1001 | 1001 | 1001 | 1001 |
| 20 | 0000 | 1111 | 0000 | 1111 | 1111 | 0000 | 1111 | 0000 | 0000 | 1111 | 0000 | 1111 | 1111 | 0000 | 1111 | 0000 |
| 21 | 0101 | 1010 | 0101 | 1010 | 1010 | 0101 | 1010 | 0101 | 0101 | 1010 | 0101 | 1010 | 1010 | 0101 | 1010 | 0101 |
| 22 | 0011 | 1100 | 0011 | 1100 | 1100 | 0011 | 1100 | 0011 | 0011 | 1100 | 0011 | 1100 | 1100 | 0011 | 1100 | 0011 |
| 23 | 0110 | 1001 | 0110 | 1001 | 1001 | 0110 | 1001 | 0110 | 0110 | 1001 | 0110 | 1001 | 1001 | 0110 | 1001 | 0110 |

FIG. 4B

WALSH CHIP WITHIN A WALSH FUNCTION

| Walsh Function Index | 0123 | 4567 | 11 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
|---|---|---|---|---|---|---|---|---|---|---|---|---|---|---|---|---|
| 24 | 0000 | 0000 | 1111 | 1111 | 1111 | 1111 | 0000 | 0000 | 0000 | 0000 | 1111 | 1111 | 1111 | 1111 | 0000 | 0000 |
| 25 | 0101 | 0101 | 1010 | 1010 | 1010 | 1010 | 0101 | 0101 | 0101 | 0101 | 1010 | 1010 | 1010 | 1010 | 0101 | 0101 |
| 26 | 0011 | 0011 | 1100 | 1100 | 1100 | 1100 | 0011 | 0011 | 0011 | 0011 | 1100 | 1100 | 1100 | 1100 | 0011 | 0011 |
| 27 | 0110 | 0110 | 1001 | 1001 | 1001 | 1001 | 0110 | 0110 | 0110 | 0110 | 1001 | 1001 | 1001 | 1001 | 0110 | 0110 |
| 28 | 0000 | 1111 | 1111 | 0000 | 1111 | 0000 | 0000 | 1111 | 0000 | 1111 | 1111 | 0000 | 1111 | 0000 | 0000 | 1111 |
| 29 | 0101 | 1010 | 1010 | 0101 | 1010 | 0101 | 0101 | 1010 | 0101 | 1010 | 1010 | 0101 | 1010 | 0101 | 0101 | 1010 |
| 30 | 0011 | 1100 | 1100 | 0011 | 1100 | 0011 | 0011 | 1100 | 0011 | 1100 | 1100 | 0011 | 1100 | 0011 | 0011 | 1100 |
| 31 | 0110 | 1001 | 1001 | 0110 | 1001 | 0110 | 0110 | 1001 | 0110 | 1001 | 1001 | 0110 | 1001 | 0110 | 0110 | 1001 |
| 32 | 0000 | 0000 | 0000 | 0000 | 0000 | 1111 | 1111 | 1111 | 1111 | 1111 | 1111 | 1111 | 1111 | 1111 | 1111 | 1111 |
| 33 | 0101 | 0101 | 0101 | 0101 | 0101 | 1010 | 1010 | 1010 | 1010 | 1010 | 1010 | 1010 | 1010 | 1010 | 1010 | 1010 |
| 34 | 0011 | 0011 | 0011 | 0011 | 0011 | 1100 | 1100 | 1100 | 1100 | 1100 | 1100 | 1100 | 1100 | 1100 | 1100 | 1100 |
| 35 | 0110 | 0110 | 0110 | 0110 | 0110 | 1001 | 1001 | 1001 | 1001 | 1001 | 1001 | 1001 | 1001 | 1001 | 1001 | 1001 |
| 36 | 0000 | 1111 | 0000 | 1111 | 0000 | 1111 | 0000 | 1111 | 1111 | 0000 | 1111 | 0000 | 1111 | 0000 | 1111 | 0000 |
| 37 | 0101 | 1010 | 0101 | 1010 | 0101 | 1010 | 0101 | 1010 | 1010 | 0101 | 1010 | 0101 | 1010 | 0101 | 1010 | 0101 |
| 38 | 0011 | 1100 | 0011 | 1100 | 0011 | 1100 | 0011 | 1100 | 1100 | 0011 | 1100 | 0011 | 1100 | 0011 | 1100 | 0011 |
| 39 | 0110 | 1001 | 0110 | 1001 | 0110 | 1001 | 0110 | 1001 | 1001 | 0110 | 1001 | 0110 | 1001 | 0110 | 1001 | 0110 |
| 40 | 0000 | 0000 | 1111 | 1111 | 0000 | 0000 | 1111 | 1111 | 1111 | 1111 | 0000 | 0000 | 1111 | 1111 | 0000 | 0000 |
| 41 | 0101 | 0101 | 1010 | 1010 | 0101 | 0101 | 1010 | 1010 | 1010 | 1010 | 0101 | 0101 | 1010 | 1010 | 0101 | 0101 |
| 42 | 0011 | 0011 | 1100 | 1100 | 0011 | 0011 | 1100 | 1100 | 1100 | 1100 | 0011 | 0011 | 1100 | 1100 | 0011 | 0011 |
| 43 | 0110 | 0110 | 1001 | 1001 | 0110 | 0110 | 1001 | 1001 | 1001 | 1001 | 0110 | 0110 | 1001 | 1001 | 0110 | 0110 |
| 44 | 0000 | 1111 | 1111 | 0000 | 0000 | 1111 | 1111 | 0000 | 1111 | 0000 | 0000 | 1111 | 1111 | 0000 | 0000 | 1111 |
| 45 | 0101 | 1010 | 1010 | 0101 | 0101 | 1010 | 1010 | 0101 | 1010 | 0101 | 0101 | 1010 | 1010 | 0101 | 0101 | 1010 |
| 46 | 0011 | 1100 | 1100 | 0011 | 0011 | 1100 | 1100 | 0011 | 1100 | 0011 | 0011 | 1100 | 1100 | 0011 | 0011 | 1100 |
| 47 | 0110 | 1001 | 1001 | 0110 | 0110 | 1001 | 1001 | 0110 | 1001 | 0110 | 0110 | 1001 | 1001 | 0110 | 0110 | 1001 |

FIG. 4C

WALSH CHIP WITHIN A WALSH FUNCTION

| Walsh Function Index | 0123 | 4567 | 11 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
|---|---|---|---|---|---|---|---|---|---|---|---|---|---|---|---|---|
| 48 | 0000 | 0000 | 0000 | 0000 | 1111 | 1111 | 1111 | 1111 | 1111 | 1111 | 1111 | 1111 | 0000 | 0000 | 0000 | 0000 |
| 49 | 0101 | 0101 | 0101 | 0101 | 1010 | 1010 | 1010 | 1010 | 1010 | 1010 | 1010 | 1010 | 0101 | 0101 | 0101 | 0101 |
| 50 | 0011 | 0011 | 0011 | 0011 | 1100 | 1100 | 1100 | 1100 | 1100 | 1100 | 1100 | 1100 | 0011 | 0011 | 0011 | 0011 |
| 51 | 0110 | 0110 | 0110 | 0110 | 1001 | 1001 | 1001 | 1001 | 1001 | 1001 | 1001 | 1001 | 0110 | 0110 | 0110 | 0110 |
| 52 | 0000 | 1111 | 0000 | 1111 | 1111 | 0000 | 1111 | 0000 | 1111 | 0000 | 1111 | 0000 | 0000 | 1111 | 0000 | 1111 |
| 53 | 0101 | 1010 | 0101 | 1010 | 1010 | 0101 | 1010 | 0101 | 1010 | 0101 | 1010 | 0101 | 0101 | 1010 | 0101 | 1010 |
| 54 | 0011 | 1100 | 0011 | 1100 | 1100 | 0011 | 1100 | 0011 | 1100 | 0011 | 1100 | 0011 | 0011 | 1100 | 0011 | 1100 |
| 55 | 0110 | 1001 | 0110 | 1001 | 1001 | 0110 | 1001 | 0110 | 1001 | 0110 | 1001 | 0110 | 0110 | 1001 | 0110 | 1001 |
| 56 | 0000 | 0000 | 1111 | 1111 | 1111 | 1111 | 0000 | 0000 | 1111 | 1111 | 0000 | 0000 | 0000 | 0000 | 1111 | 1111 |
| 57 | 0101 | 0101 | 1010 | 1010 | 1010 | 1010 | 0101 | 0101 | 1010 | 1010 | 0101 | 0101 | 0101 | 0101 | 1010 | 1010 |
| 58 | 0011 | 0011 | 1100 | 1100 | 1100 | 1100 | 0011 | 0011 | 1100 | 1100 | 0011 | 0011 | 0011 | 0011 | 1100 | 1100 |
| 59 | 0110 | 0110 | 1001 | 1001 | 1001 | 1001 | 0110 | 0110 | 1001 | 1001 | 0110 | 0110 | 0110 | 0110 | 1001 | 1001 |
| 60 | 0000 | 1111 | 1111 | 0000 | 1111 | 0000 | 0000 | 1111 | 1111 | 0000 | 0000 | 1111 | 0000 | 1111 | 1111 | 0000 |
| 61 | 0101 | 1010 | 1010 | 0101 | 1010 | 0101 | 0101 | 1010 | 1010 | 0101 | 0101 | 1010 | 0101 | 1010 | 1010 | 0101 |
| 62 | 0011 | 1100 | 1100 | 0011 | 1100 | 0011 | 0011 | 1100 | 1100 | 0011 | 0011 | 1100 | 0011 | 1100 | 1100 | 0011 |
| 63 | 0110 | 1001 | 1001 | 0110 | 1001 | 0110 | 0110 | 1001 | 1001 | 0110 | 0110 | 1001 | 0110 | 1001 | 1001 | 0110 |

METHOD AND APPARATUS FOR TRANSMITTING AND RECEIVING HIGH SPEED DATA IN A CDMA COMMUNICATION SYSTEM USING MULTIPLE CARRIERS

CROSS REFERENCE

This application claims priority from co-pending U.S. application Ser. No. 08/931,536, filed Sep. 16, 1997 entitled Method and Apparatus for Transmitting and Receiving High Speed Data in a CDMA Communication System Using Multiple Carriers and currently assigned to the assignee of the present application.

BACKGROUND OF THE INVENTION

1. Field of the Invention

The present invention relates to communications. More particularly, the present invention relates to a novel and improved method and apparatus for maximizing system throughput and increasing signal diversity by dynamically multiplexing signals onto multiple carriers in a spread spectrum communication system.

2. Description of the Related Art

The present invention is concerned with transmitting data at rates which are higher than the maximum data rate of a single CDMA channel. A traditional CDMA channel (as standardized for cellular communication in the United States) is capable of carry digital data at a maximum rate of 9.6 bits per second using a 64 bit Walsh spreading function at 1.2288 MHz.

Many solutions to this problem have been proposed. One solution is to allocate multiple channels to the users and allow those users to transmit and receive data in parallel on the plurality of channels available to them. Two methods for providing multiple CDMA channels for use by a single user are described in U.S. Pat. No. 6,005,855, entitled "METHOD AND APPARATUS FOR PROVIDING VARIABLE RATE DATA IN A COMMUNICATIONS SYSTEM USING STATISTICAL MULTIPLEXING", filed Apr. 28, 1997 and U.S. Pat. No. 5,777,990, entitled "METHOD AND APPARATUS FOR PROVIDING VARIABLE RATE DATA IN A COMMUNICATIONS SYSTEM USING NON-ORTHOGONAL OVERFLOW CHANNELS", filed Apr. 16, 1997, both of which are assigned to the assignee of the present invention and are incorporated by reference herein. In addition, frequency diversity can be obtained by transmitting data over multiple spread spectrum channels that are separated from one another in frequency. A method and apparatus for redundantly transmitting data over multiple CDMA channels is described in U.S. Pat. No. 5,166,951, entitled "HIGH CAPACITY SPREAD SPECTRUM CHANNEL", which is incorporated by reference herein.

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. However, the spread spectrum modulation technique of CDMA has significant advantages over these other modulation techniques for multiple access communication systems.

The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein. Code division multiple access communications systems have been standardized in the United States in Telecommunications Industry Association Interim Standard IS-95, entitled "Mobile Station-Base Station Compatibility Standard for Dual Mode Wideband Spread Spectrum Cellular System", which is incorporated by reference herein.

The CDMA waveform by its inherent nature of being a wideband signal offers a form of frequency diversity by spreading the signal energy over a wide bandwidth. Therefore, frequency selective fading affects only a small part of the CDMA signal bandwidth. Space or path diversity on the forward/reverse link is obtained by providing multiple signal paths through simultaneous links to/from a mobile user through two or more antennas, cell sectors or cell-sites. Furthermore, path diversity may be obtained by exploiting the multipath environment through spread spectrum processing by allowing a signal arriving with different propagation delays to be received and processed separately. Examples of the utilization of path diversity are illustrated in U.S. Pat. No. 5,101,501 entitled "SOFT HANDOFF IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

FIG. 1 illustrates a transmission scheme for a multiple-carrier code division multiple access (CDMA) system in which each carrier carries a fixed fraction of the transmitted data. Variable rate frame of information bits are provided to encoder 2 which encodes the bits in accordance with a convolutional encoding format. The encoded symbols are provided to symbol repetition means 4. Symbol repetition means 4 repeats the encoded symbols so as to provide a fixed rate of symbols out of symbol repetition means 4, regardless of the rate of the information bits.

The repeated symbols are provided to block interleaver 6 rearranges the sequence in which the symbols are to be transmitted. The interleaving process, coupled with the forward error correction, provides time diversity which aids in the reception and error recovery of the transmitted signal in the face of burst errors. The interleaved symbols are provided to data scrambler 12. Data scrambler 12 multiplies each interleaved symbol by (+1 or −1) according to a pseudonoise (PN) sequence. The pseudonoise sequence is provided by passing a long PN sequence generated by long code generator 8 at the chip rate through decimator 10 which selectively provides a subset of the chips of the long code sequence at the rate of the interleaved symbol stream.

The data from data scrambler 12 is provided to demultiplexer (DEMUX) 14. Demultiplexer 14 divides the data stream into three equal sub-streams. The first sub-stream is provided to transmission subsystem 15a, the second sub-stream to transmission subsystem 15b and the third sub-stream to transmission subsystem 15c. The subframes are provided to serial-to-parallel (BINARY TO 4 LEVEL) 16a-

16c. The outputs of serial to parallel converters 16a-16c are quaternary symbols (2bits/symbol) to be transmitted in a QPSK modulation format The signals from serial-to-parallel converters 16a-16c are provided to Walsh coders 18a-18c. In Walsh coders 18a-18c, the signals from converters 16a is multiplied by a Walsh sequence consisting of □1 values. The Walsh coded data is provided to QPSK spreaders 20a-20c, which spread the data in accordance with two short PN sequences. The short PN sequence spread signals are provided to amplifiers 22a-22b which amplify the signals in accordance with a gain factor.

The system described above suffers from a plurality of drawbacks. First, because the data is to be provided in equal sub-streams on each of the carriers, the available numerology is limited to frames with a number of code symbols that will divide evenly by a factor of three. Table 1 below illustrates the limited number of possible rate sets which are available using the transmission system illustrated in FIG. 1.

Therefore, there is a need felt for an improved multi-carrier CDMA communication system which offers greater flexibility in numerology and load balancing, better resolution in data rates supported, and which offers superior performance in the face of frequency dependent fading and uneven loading.

SUMMARY OF THE INVENTION

To better utilize the channel resource, it's necessary to be able to transmit a different data rate on each carrier according to the channel condition and the available power on each channel. One way of doing this is by changing the ratio of the inverse-multiplexing on to each of the carriers. Instead of distributing the symbols with a ratio of 1:1:1, a more arbitrary ratio can be used together with different repetition schemes as long as the resulted symbol rate on each carrier

TABLE 1

| Walsh Function (QPSK Symbol) Rate [sps] | Number of Walsh Functions per 20 ms | | Length of Walsh Function [chips] | Symbol Rate [sps] (After Repetition) | Number of Symbols per 20 ms. | |
|---|---|---|---|---|---|---|
| 1228800 | 24576 | 3*2^13 | 1 | 2457600 | 49152 | 3*2^14 |
| 614400 | 12288 | 3*2^12 | 2 | 1228800 | 24576 | 3*2^13 |
| 307200 | 6144 | 3*2^11 | 4 | 614400 | 12288 | 3*2^12 |
| 153600 | 3072 | 3*2^10 | 8 | 307200 | 61444 | 3*2^11 |
| 76800 | 1536 | 3*2^9 | 16 | 153600 | 3072 | 3*2^10 |
| 38400 | 768 | 3*2^8 | 32 | 76800 | 1536 | 3*2^9 |
| 19200 | 384 | 3*2^7 | 64 | 38400 | 768 | 3*2^8 |
| 9600 | 192 | 3*2^6 | 128 | 19200 | 384 | 3*2^7 |
| 4800 | 96 | 3*2^5 | 256 | 9600 | 192 | 3*2^6 |
| 2400 | 48 | 3*2^4 | 512 | 4800 | 96 | 3*2^5 |
| 1200 | 24 | 3*2^3 | 1024 | 2400 | 48 | 3*2^4 |
| 600 | 12 | 3*2^2 | 2048 | 1200 | 24 | 3*2^3 |
| 300 | 6 | 3*2^1 | 4096 | 600 | 12 | 3*2^2 |
| 150 | 3 | 3*2^0 | 8192 | 300 | 6 | 3*2^1 |

As illustrated in Table 1, because the symbols are evenly distributed to the three carriers, the total data rate is limited by the carrier with the least power available or requiring the highest SNR. That is the total data rate is equal to three times the data rate of the "worst" link (here the worst means the one requiring the highest SNR or having the least power available). This reduces the system throughput, because the worst link's rate is always chosen as the common rate for all three carriers, which results in under utilization of the channel resource on the two better links.

Second, frequency dependent fading can severely affect one of the frequencies while having a limited effect on the remaining frequencies. This implementation is inflexible and does not allow transmission of a frame to be provided in a way that reduces the effects of the poor channel. Third, because of frequency dependent fading, the fading will typically always affect the same groups of symbols of each frame. Fourth, were the implementation to be superimposed on a speech transmission system there is no good way to balance the loads carried on the different frequencies on a frame by frame basis in the face of variable speech activities in each frame. This results in loss in total system throughput. And fifth, for a system with only three frequency channels, with the implementation described, there is no method of separating the speech and data so as to provide the data on one frequency or set of frequencies and the speech on a different frequency or set of frequencies. This results in a loss of system throughput as mentioned above.

is a factor of some Walsh function rate. Walsh function rate can be 1228800, 614400, 307200, ..., 75 for Walsh function length from 1 to 16384.

Given the Walsh function length, if the symbol rate is lower than the Walsh function rate, symbol repetition is used to "match" the rate. The repetition factor can be any number, integer or fractional. It will be understood by one skilled in the art that when repetition is present, the total transmit power can be proportionately reduced to keep the code symbol energy constant. The Walsh function length may or may not be the same on the three carriers, depending on whether we need to save code channels. For example, if the supportable code symbol rate on the three channels are 153600 sps, 30720 sps and 102400 sps (for rate ½ coding, these correspond to data rates of 76.8 kbps, 15.36 kbps and 51.2 kbps, respectively—the total data rate is 143.36 kbps), then the inverse-multiplexing ratio will be 15:3:10.

If a Walsh function of length 8 is used for all three channels (assuming QPSK modulation with a QPSK symbol rate of 153.6 Ksps), then each code symbol is transmitted twice, TEN times, and three times on the three channels, respectively. Additional time diversity can be obtained if the repeated symbols are further interleaved. In an alternative embodiment, different Walsh function lengths are used. For example, Walsh functions for the three channels in the example of above of length 16, 16 and 8 respectively can be used, with each code symbol transmitted once on the first channel, five times on the second, and three times on the third.

The above approach does not affect the encoder since it has to be able to handle the highest data rate anyway. All that is changed is the number of data octets at the encoder input. However, this approach does have an impact on the implementation of the interleaver because the interleaver will have many possible sizes (in terms of number of symbols) if all combinations of data rates on the three channels are allowed. One alternative to the above approach which mitigates this problem is to inverse-multiplex the code symbols out of the encoder to the three carriers directly and perform interleaving of repeated code symbols on each channel separately. This simplifies the numerology and reduces the number of possible interleaver sizes on each channel.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 4A-C are tables of code channel Walsh symbols in a traditional IS-95 CDMA communication system.

DETAILED DESCRIPTION OF THE PREFERRED EMBODIMENTS

Figure 1:
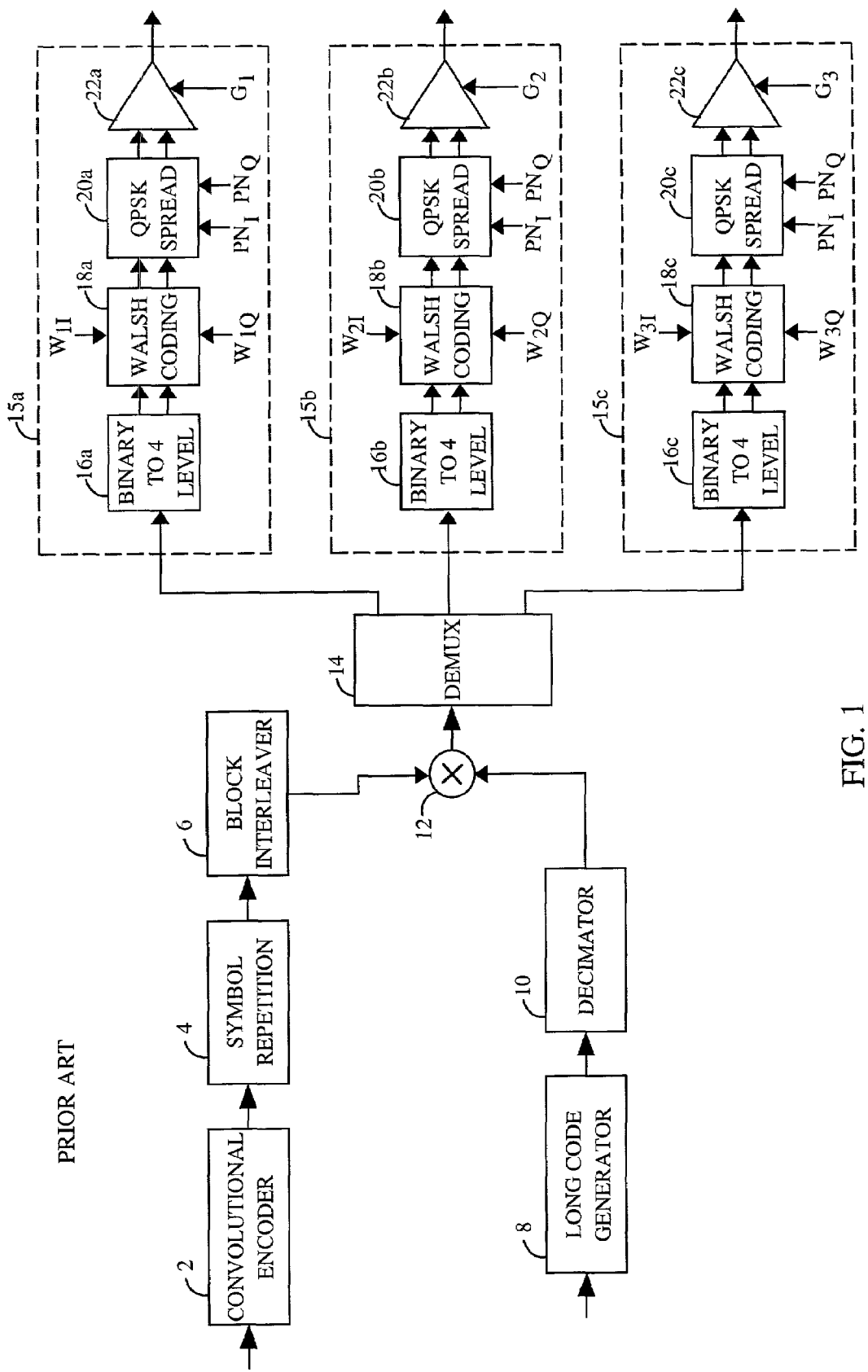
FIG. 1 is a block diagram illustrating a multiple frequency CDMA communication system with fixed rates and carriers.
Figure 2:
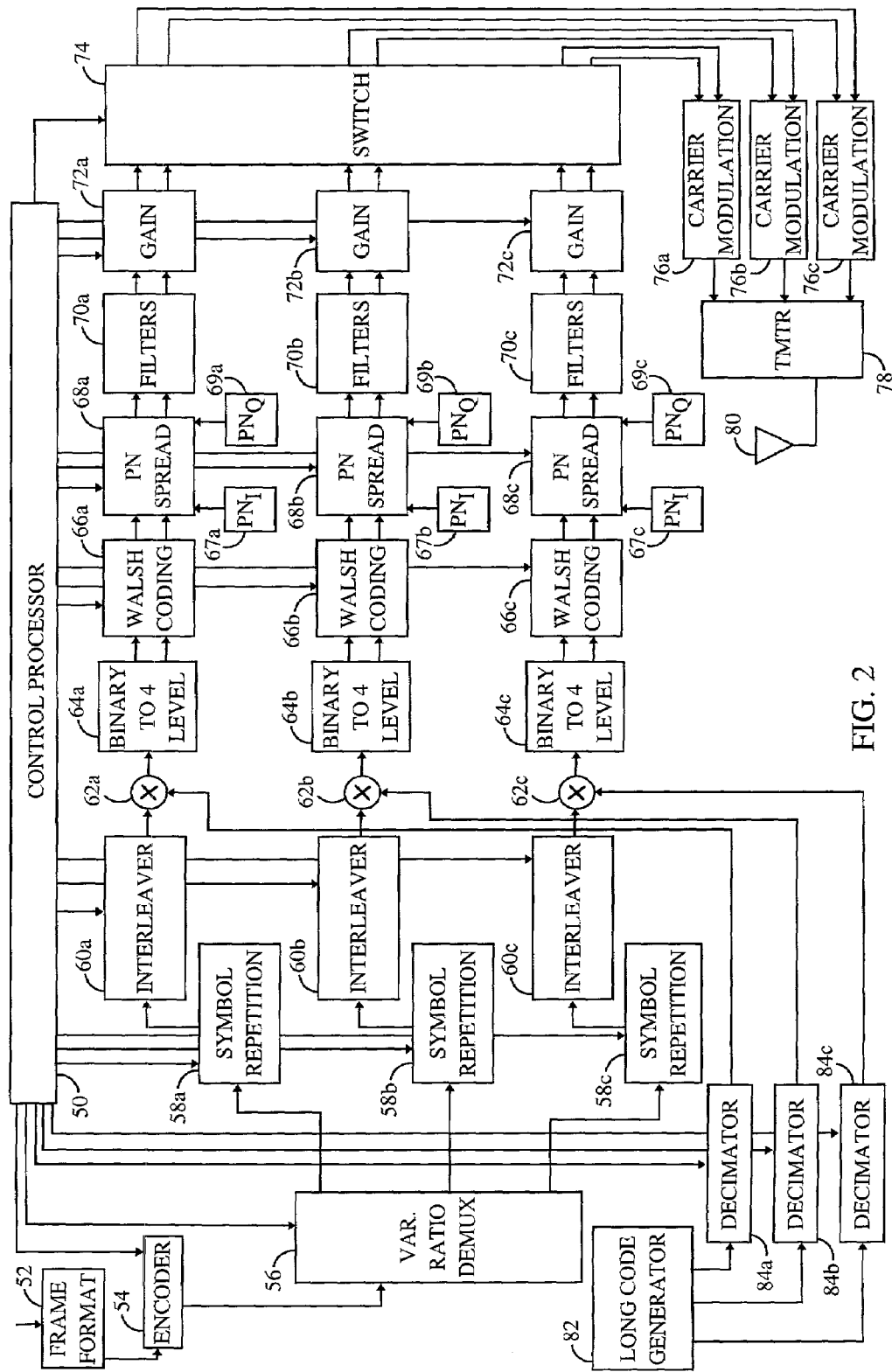
FIG. 2 is a block diagram illustrating the transmission system of the present invention.

Referring to FIG. 2, the first operation to be performed is to determine the amount of data which can be supported on each of the carriers. Three such carriers are illustrated in FIG. 2, though one skilled in the art will realize that the present invention is easily extended to any number of carriers. Control processor 50 based on a set of factors such as the loading on each of the carriers, the amount of data queued for transmission to the mobile station and the priority of the information to be transmitted to the mobile station determines the rate of data transmission on each of the carriers.

After having selected the data rate to be transmitted on each of the carriers, control processor 50 selects a modulation format that is capable of transmitting data at the selected rate. In the exemplary embodiment, different length Walsh sequences are used to modulate the data depending on the rate of the data to be transmitted. The use of different length Walsh sequences selected to modulate the data depending on the rate of the data to be transmitted is described in detail in 5,930,230, filed May 28, 1996, entitled "HIGH RATE DATA WIRELESS COMMUNICATION SYSTEM", which is assigned to the assignee of the present invention and incorporated by reference herein. In an alternative embodiment, the high rate data can be supported by bundling of CDMA channels as described in the aforementioned U.S. Pat. Nos. 6,005,855 and 5,777,990.

Once the rates which will be supported on each of the carriers is selected then control processor 50 calculates an inverse multiplexing ratio that will determine the amount of each transmission that will be carried on each of the carriers. For example, if the supportable code symbol rate on the three channels are 153600 sps, 30720 sps and 102400 sps (for rate ½ coding, these correspond to data rates of 76.8 kbps, 15.36 kbps and 51.2 kbps, respectively—the total data rate is 143.36 kbps), then the inverse-multiplexing ratio will be 15:3:10.

In the exemplary embodiment, frames of information bits are provided to frame formatter 52. In the exemplary embodiment, formatter 52 generates and appends to the frame a set of cyclic redundancy check (CRC) bits. In addition, formatter 52 appends a predetermined set of tail bits. The implementation and design of frame formatters are well known in the art, an example of a typical frame formatter is described in detail in U.S. Pat. No. 5,600,754, entitled "METHOD AND SYSTEM FOR THE ARRANGEMENT OF VOCODER DATA FOR THE MASKING OF TRANSMISSION CHANNEL INDUCED ERRORS", which is assigned to the assignee of the present invention and incorporated by reference herein.

The formatted data is provided to encoder 54. In the exemplary embodiment, encoder 54 is a convolutional encoder, though the present invention can be extended to other forms of encoding. A signal from control processor 50 indicates to encoder 54 the number of bits to be encoded in this transmission cycle. In the exemplary embodiment, encoder 54 is a rate ¼ convolutional encoder with a constraint length of 9. It should be noted that because of the additional flexibility provided by the present invention, essentially any encoding format can be used.

The encoded symbols from encoder 54 are provided to variable ratio de-multiplexer 56. Variable ratio de-multiplexer 56 provides the encoded symbols to a set of outputs based on a symbol output signal provided by control processor 50. In the exemplary embodiment, there are three carrier frequencies and control processor 50 provides a signal indicative of the number of encoded symbols to be provided on each of the three outputs. As one skilled in the art will appreciate, the present invention is easily extended to an arbitrary number of frequencies.

The encoded symbols provided on each of the outputs of variable ratio de-multiplexer demultiplexer 56 are provided to a corresponding symbol repetition means 58a-58c. Symbol repetition means 58a-58c generate repeated versions of the encoded symbols so that the resultant symbol rate matches with the rate of data supported on that carrier and in particular matches Walsh function rate used on that carrier. The implementation of repetition generators 58a-58c is known in the art and an example of such is described in detail in U.S. Pat. No. 5,629,955, entitled "Variable Response Filter", which is assigned to the assignee of the present invention and incorporated by reference herein. Control processor 50 provides a separate signal to each repetition generator 58a-58c indicating the rate of symbols on each carrier or alternatively the amount of repetition to be provided on each carrier. In response to the signal from control processor 50, repetition means 58a-58c generate the requisite number of repeated symbols to provide the designated symbol rates. It should be noted that in the preferred embodiment, the amount of repetition is not limited to integer number wherein all symbols are repeated the same number of times. A method for providing non-integer repetition is described in detail in copending U.S. patent application Ser. No. 08/886,815, filed Mar. 26, 1997, entitled "METHOD AND APPARATUS FOR TRANSMITTING HIGH SPEED DATA IN A SPREAD SPECTRUM COMMUNICATIONS SYSTEM", which is assigned to the assignee of the present invention and incorporated by reference herein.

The symbols from repetition generators 58a-58c are provided to a corresponding one of interleavers 60a-60c which reorders the repeated symbols in accordance with a predetermined interleaver format. Control processor 50 provides an interleaving format signal to each of interleavers 60a-60c which indicates one of a predetermined set of interleaving formats. In the exemplary embodiment, the interleaving format is selected from a predetermined set of bit reversal interleaving formats.

The reordered symbols from interleavers 60a-60c are provided data scramblers 62a-62c. Each of data scramblers 62a-62c changes the sign of the data in accordance with a pseudonoise (PN) sequence. Each PN sequence is provided by passing a long PN code generated by long code generator 82 at the chip rate through a decimator 84a-84c, which selectively provides ones of the spreading symbols to provide a PN sequence at a rate no higher than that provided by PN generator 82. Because the symbol rate on each carrier may be different from one another, the decimation rate of decimators 84a-84c may be different. Decimators 84a-84c are sample and hold circuits which sample the PN sequence out of PN generator 82 and continue to output that value for a predetermined period. The implementation of PN generator 82 and decimators 84a-84c are well known in the art and are described in detail in the aforementioned U.S. Pat. No. 5,103,459. Data scramblers 62a-62c exclusively-OR the binary symbols from interleavers 60a-60c with the decimated pseudonoise binary se The binary scrambled symbol sequences are provided to serial to parallel converters (BINARY TO 4-LEVEL) 64a-64c. Two binary symbols provided to converters 64a-64c are mapped to a quaternary constellation with values (±1, ±1). The constellation values are provided on two outputs from converters 62a-62c. The symbol streams from converters 64a-64c are separately provided to Walsh spreaders 66a-66c.

There are many methods of providing high speed data in a code division multiple access communication system. In the preferred embodiment, the Walsh sequence length is varied in accordance with the rate of the data to be modulated. Shorter Walsh sequences are used to modulate higher speed data and longer Walsh sequences are used to modulate lower rate data. For example, a 64 bit Walsh sequence can be used to transmit data at 19.2 Ksps. However, a 32 bit Walsh sequence can be used to modulate data at 38.4 Ksps.

A system describing variable length Walsh sequence modulation is described in detail in U.S. Pat. No. 6,173,007, entitled "HIGH DATA RATE SUPPLEMENTAL CHANNEL FOR CDMA TELECOMMUNICATIONS SYSTEM", filed Jan. 15, 1997 and incorporated by reference herein. The length of the Walsh sequences used to modulate the data depend on the rate of the rate of the data to be transmitted. FIGS. 4A-C illustrate the Walsh functions in a traditional IS-95 CDMA system.

In the preferred embodiment of the invention, the number of Walsh channels allocated for the high-rate data can be any value $2^N$ where N={2, 3, 4, 5, 6}. The Walsh codes used by Walsh coders 66a-66c are $^{64}/_{2^N}$ symbols long, rather than the 64 symbols used with the IS-95 Walsh codes. In order for the high-rate channel to be orthogonal to the other code channels with 64-symbol Walsh codes, $2^N$ of the possible 64 quaternary-phase channels with 64-symbol Walsh are eliminated from use. Table 1 provides a li Walsh codes for each value of N and the corresponding sets of allocated 64-symbol Walsh codes.

TABLE I

| N | Walsh$_i$ | Allocated 64-Symbol Walsh Codes |
|---|---|---|
| 2 | +, +, +, +, +, +, +, +, +, +, +, +, +, +, +, + | 0, 16, 32, 48 |
|   | +, −, +, −, +, −, +, −, +, −, +, −, +, −, +, − | 1, 17, 33, 49 |
|   | +, +, −, −, +, +, −, −, +, +, −, −, +, +, −, − | 2, 18, 34, 50 |
|   | +, −, −, +, +, −, −, +, +, −, −, +, +, −, −, + | 3, 19, 35, 51 |
|   | +, +, +, +, −, −, −, −, +, +, +, +, −, −, −, − | 4, 20, 36, 52 |
|   | +, −, +, −, −, +, −, +, +, −, +, −, −, +, −, + | 5, 21, 37, 53 |
|   | +, +, −, −, −, −, +, +, +, +, −, −, −, −, +, + | 6, 22, 38, 54 |
|   | +, −, −, +, −, +, +, −, +, −, −, +, −, +, +, − | 7, 23, 39, 55 |
|   | +, +, +, +, +, +, +, +, −, −, −, −, −, −, −, − | 8, 24, 40, 56 |
|   | +, −, +, −, +, −, +, −, −, +, −, +, −, +, −, + | 9, 25, 41, 57 |
|   | +, +, −, −, +, +, −, −, −, −, +, +, −, −, +, + | 10, 26, 42, 58 |
|   | +, −, −, +, +, −, −, +, −, +, +, −, −, +, +, − | 11, 27, 43, 59 |
|   | +, +, +, +, −, −, −, −, −, −, −, −, +, +, +, + | 12, 28, 44, 60 |
|   | +, −, +, −, −, +, −, +, −, +, −, +, +, −, +, − | 13, 29, 45, 61 |
|   | +, +, −, −, −, −, +, +, −, −, +, +, +, +, −, − | 14, 30, 46, 62 |
|   | +, −, −, +, −, +, +, −, −, +, +, −, +, −, −, + | 15, 31, 47, 63 |
| 3 | +, +, +, +, +, +, +, + | 0, 8, 16, 24, 32, 40, 48, 56 |
|   | +, −, +, −, +, −, +, − | 1, 9, 17, 25, 33, 41, 49, 57 |
|   | +, +, −, −, +, +, −, − | 2, 10, 18, 26, 34, 42, 50, 58 |
|   | +, −, −, +, +, −, −, + | 3, 11, 19, 27, 35, 43, 51, 59 |
|   | +, +, +, +, −, −, −, − | 4, 12, 20, 28, 36, 44, 52, 60 |
|   | +, −, +, −, −, +, −, + | 5, 13, 21, 29, 37, 45, 53, 61 |
|   | +, +, −, −, −, −, +, + | 6, 14, 22, 30, 38, 46, 54, 62 |
|   | +, −, −, +, −, +, +, − | 7, 15, 23, 31, 39, 47, 55, 63 |
| 4 | +, +, +, + | 0, 4, 8, ≡, 60 |
|   | +, −, +, − | 1, 5, 9, ≡, 61 |
|   | +, +, −, − | 2, 6, 10, ≡, 62 |
|   | +, −, −, + | 3, 7, 11, ≡, 63 |
| 5 | +, + | 0, 2, 4, ≡, 62 |
|   | +, − | 1, 3, 5, ≡, 63 |
| 6 | + | 0, 1, 2, ≡, 63 |

The + and − indicate a positive or negative integer value, where the preferred integer is 1. As is apparent, the number of Walsh symbols in each Walsh code varies as N varies, and in all instances is less than the number of symbols in the IS-95 Walsh channel codes. Regardless of the length of the Walsh code, in the described embodiment of the invention the symbols are applied at a rate of 1.2288 Megachips per second (Mcps). Thus, shorter length Walsh codes are repeated more often. Control processor 50 provides a signal to Walsh coding elements 66a-66c which indicates the Walsh sequence to be used to spread the data.

Alternative methods for transmitting high rate data in CDMA communication system also include methods generally referred to as channel bundling techniques. The present invention is equally applicable to the channel bundling methods for providing high speed data in a CDMA communication system. One method of providing channel bundled data is to provide a plurality of Walsh channels for use by a signal user. This method is described in detail in the aforementioned U.S. Pat. No. 5,818,871. An alternative channel bundling technique is to provide the user with use of one Walsh code channel but to differentiate the signals from one another by means of different scrambling signals as described in detail in U.S. Pat. No. 5,777,990.

The Walsh spread data is provided to PN spreaders 68a-68c, which apply a short PN sequence spreading on the output signals. In the exemplary embodiment, the PN spreading is performed by means of a complex multiplication as described in detail in the aforementioned U.S. Pat.

No. 6,173,007. Data channels $D_I$ and $D_Q$ are complex multiplied, as the first real and imaginary terms respectively, with spreading codes $PN_I$ and $PN_Q$, as the second real and imaginary terms respectively, yielding the in-phase (or real) term $X_I$ and quadrature-phase (or imaginary) term $X_Q$. Spreading codes $PN_I$ and $PN_Q$ are generated by spreading code generators 67 and 69. Spreading codes $PN_I$ and $PN_Q$ are applied at 1.2288 Mcps. Equation (1) illustrates the complex multiplication performed.

$$(X_I + jX_Q) = (D_I + jD_Q)(PN_I + jPN_Q) \quad (1)$$

In-phase term $X_I$ is then low-pass filtered to a 1.2288 MHz bandwidth (not shown) and upconverted by multiplication with in-phase carrier $COS(\omega_c t)$. Similarly, quadrature-phase term $X_Q$ is low-pass filtered to a 1.2288 MHz bandwidth (not shown) and upconverted by multiplication with quadrature-phase carrier $SIN(\omega_c t)$. The upconverted $X_I$ and $X_Q$ terms are summed yielding forward link signal s(t). The complex multiplication allows quadrature-phase channel set to remain orthogonal to the in-phase channel set and therefore to be provided without adding additional interference to the other channels transmitted over the same path with perfect receiver phase recovery.

The PN spread data is, then, provided to filters 70a-70c which spectrally shape the signals for transmission. The filtered signals are provided to gain multipliers 72a-72c, which amplify the signals for each carrier. The gain factor is supplied to gain elements 72a-72c by control processor 50. In the exemplary embodiment, control processor 50 selects the gain factor for each carrier in accordance with the channel condition and the rate of the information data to be transmitted on that carrier. As is known by one skilled in the art, data that is transmitted with repetition can be transmitted with lower symbol energy than data without repetition.

The amplified signals are provided to an optional switch 74. Switch 74 provides the additional flexibility of channel hopping the data signals onto different carriers. Typically, switch 74 is only used when the number of carriers actually used to transmit the signal is smaller that the total number of possible carriers (3 in the present example).

The data is passed by switch 74 to carrier modulators 76a-76c. Each of carrier modulators 76a-76c upconvert the data to a different predetermined frequency. The upconverted signals are provided to transmitter 78 where they are combined with other similarly processed signals, filtered and amplified for transmission through antenna 80. In the exemplary embodiment, the amplified frequency upon which each of the signals are transmitted varies with time. This provides additional frequency diversity for the transmitted signals. For example a signal that is currently being transmitted through carrier modulator 76a will at predetermined time interval be switched so as to be transmitted on a different frequency through carrier modulators 76b or 76c. In accordance with a signal from control processor 50, switch 74 directs an amplified input signal from gain multiplier 72a-72c to an appropriate carrier modulator 76a-76c.

Figure 3:
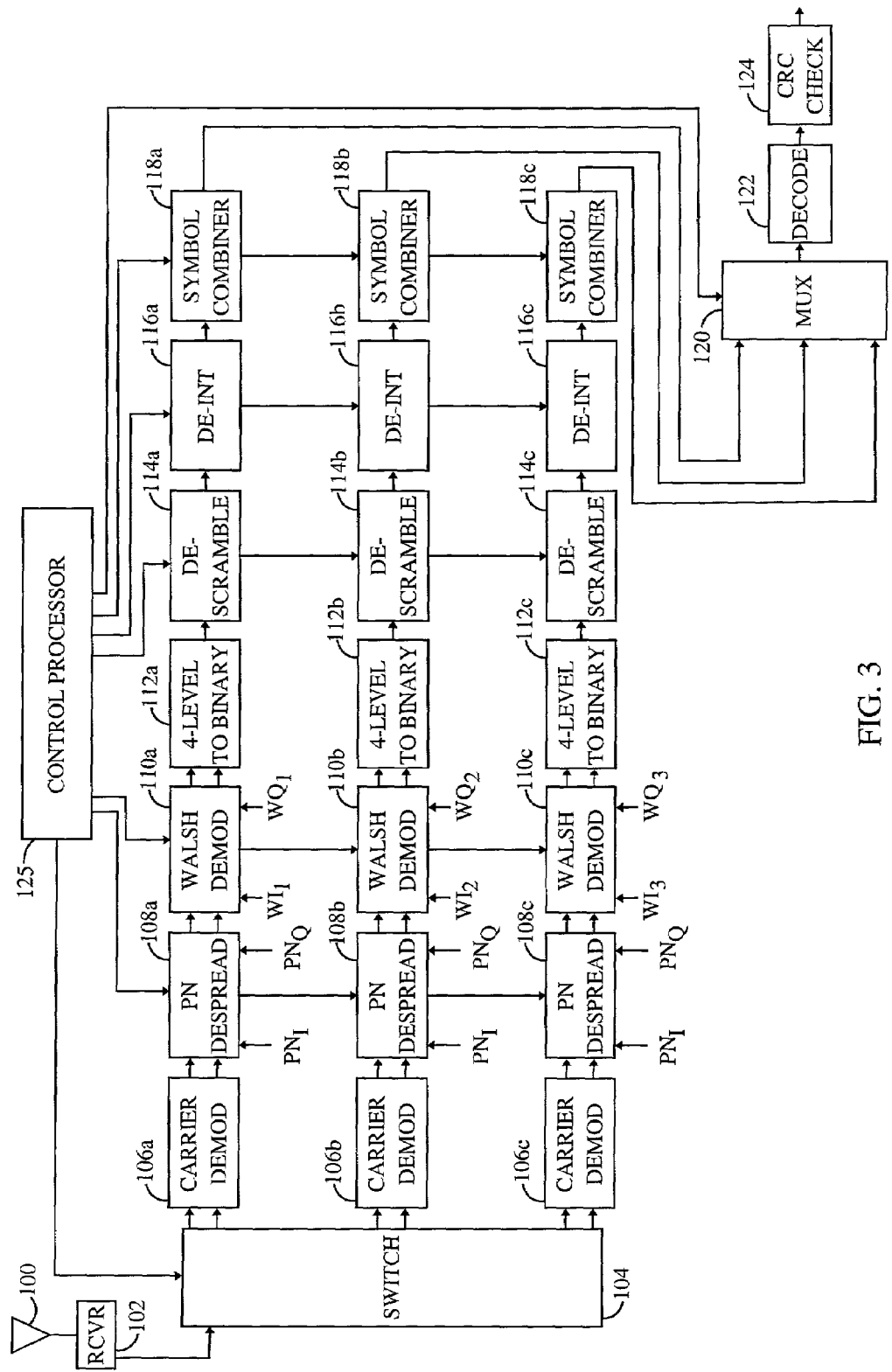
FIG. 3 is a block diagram illustrating the receiver system of the present invention.

Turning to FIG. 3, the receiver system for the present invention is illustrated. The signal received at antenna 100 is passed to receiver (RCVR) 102, which amplifies and filters the signal before providing it to switch 104. The data is provided through switch 104 to an appropriate carrier demodulator 106a-106c. It will be understood by one skilled in the art that although the receiver structure is described for the reception of a signal transmitted on three frequencies, the present invention can easily be extended to an arbitrary number of frequencies consecutive to one another or not.

When the carriers on which the data is transmitted are rotated or hopped to provide additional frequency diversity, switch 104 provides the received signal to a selected carrier demodulator 106a-106c in response to a control signal from control processor 125. When the carrier frequencies are not hopped or rotated, then switch 104 is unnecessary. Each of carrier demodulators 106a-106c Quaternary Phase Shift Keying (QPSK) demodulate the received signal to baseband using a different downconversion frequency to provide a separate I and Q baseband signals.

The downconverted signals from each of carrier demodulators 106a-106c are provided to a corresponding PN despreader 108a-108c which removes the short code spreading from the downconverted data. The I and Q signals are despread by complex multiplication with a pair of short PN code. The PN despread data is provided to Walsh demodulators 110a-110c, which uncover the data in accordance with the assigned code channel sequences. In the exemplary embodiment, Walsh functions are used in the generation and reception of the CDMA signals but other forms of code channel generation are equally applicable. Control processor 125 provides a signal to Walsh demodulators 110a-110c indicating the Walsh sequences to be used to uncover the data.

The Walsh despread symbols are provided to parallel-to-serial converters (4-LEVEL TO BINARY) 112a-112c, which map the 2-dimensional signal into a 1-dimensional signal. The symbols are then provided to descramblers 114a-114c. Descramblers 114a-114c descramble the data in accordance with a decimated long code sequence generated as described with respect to the decimated long code sequences used to scramble the data in FIG. 2.

The descrambled data is provided to de-interleavers (DE-INT) 116a-116c. De-interleavers 116a-116c reorder the symbols in accordance with selected de-interleaver formats that are provided by control processor 125. In the exemplary embodiment, control processor 125 provides a signal indicative of the size of the deinterleaver and the scheme of de-interleaving to each of de-interleavers 116a-116c. In the exemplary embodiment, the de-interleaving scheme is selected from a predetermined set of bit reversal de-interleaving schemes.

The de-interleaved symbols are then provided to symbol combiners 118a-118c which coherently combine those repeatedly transmitted symbols. The combined symbols (soft decisions) are then provided to variable ratio multiplexer 120 which reassembles the data stream and provides the reassembled data stream to decoder 122. In the exemplary embodiment decoder 122 is a maximum likelihood decoder, the implementation of which is well known in the art. In the exemplary embodiment, decoder 122 contains a buffer (not shown) which waits until an entire frame of data has been provided to it before beginning the decoding process. The decoded frame is provided to CRC check means 124 which determines whether the CRC bits check and if so provides them to the user otherwise an erasure is declared.

I claim:

1. A wireless transmitter, comprising:
   an encoder for encoding a set of information bits to provide a set of code symbols at a data rate;
   a demultiplexer for providing said set of code symbols in first and second code symbol subsets having different code symbol rates to first and second modulators, wherein said data rate is equal to a combined said different code symbol rates, said first and second modulators respectively modulating said first and second code symbol subsets according to first and second code symbol rate formats, respectively, wherein said different code symbol rates have a ratio equal a number other than one, to provide modulated first code symbol subset and second code symbol subset.

2. The wireless transmitter of claim 1 wherein said first and second modulators repeat code symbols within said first and second code symbol subsets, respectively, according to a said respective code symbol rate.

3. The wireless transmitter of claim 2 wherein said transmission subsystem scales a respective energy of said first and second modulated code symbol subsets according to a respective amount of code symbol repetition.

4. The wireless transmitter of claim 1 wherein said first modulator includes a first interleaver having a first interleaver format dependent on a first code symbol rate, and said second modulator includes a second interleaver having a second interleaver format dependent on a second code symbol rate.

5. The wireless transmitter of claim 1 wherein said first modulator includes a first PN scrambler for scrambling said first code symbol subset according to a first code symbol rate, and said second modulator includes a second PN scrambler for scrambling said second code symbol subset according to a second code symbol rate.

6. A wireless transmitter, comprising:
means for encoding a set of information bits to provide a set of code symbols at a data rate; and
means for providing said set of code symbols in first and second code symbol subsets having different code symbol rates to first and second modulators, wherein said data rate is equal to a combined said different code symbol rates, said first and second modulators respectively modulating said first and second code symbol subsets according to first and second code symbol rate formats, respectively, wherein said different code symbol rates have a ratio equal a number other than one, to provide modulated first code symbol subset and second code symbol subset.

7. The wireless transmitter of claim 6 wherein said first and second modulators repeat code symbols within said first and second code symbol subsets, respectively, according to a said respective code symbol rate.

8. The wireless transmitter of claim 6 wherein said transmission subsystem scales a respective energy of said first and second modulated code symbol subsets according to a respective amount of code symbol repetition.

9. The wireless transmitter of claim 6 wherein said first modulator includes a first interleaver having a first interleaver format dependent on a first code symbol rate, and said second modulator includes a second interleaver having a second interleaver format dependent on a second code symbol rate.

10. The wireless transmitter of claim 6 wherein said first modulator includes a first PN scrambler for scrambling said first code symbol subset according to a first code symbol rate, and said second modulator includes a second PN scrambler for scrambling said second code symbol subset according to a second code symbol rate.

11. A method operational on a wireless transmitter, comprising:
encoding a set of information bits to provide a set of code symbols at a data rate; and
providing said set of code symbols in first and second code symbol subsets having different code symbol rates to first and second modulators, wherein said data rate is equal to a combined said different code symbol rates, said first and second modulators respectively modulating said first and second code symbol subsets according to first and second code symbol rate formats, respectively, wherein said different code symbol rates have a ratio equal a number other than one, to provide modulated first code symbol subset and second code symbol subset.

12. The method claim 11 wherein said first and second modulators repeat code symbols within said first and second code symbol subsets, respectively, according to a said respective code symbol rate.

13. The method claim 11 wherein said transmission subsystem scales a respective energy of said first and second modulated code symbol subsets according to a respective amount of code symbol repetition.

14. The method claim 11 wherein said first modulator includes a first interleaver having a first interleaver format dependent on a first code symbol rate, and said second modulator includes a second interleaver having a second interleaver format dependent on a second code symbol rate.

15. The method claim 11 wherein said first modulator includes a first PN scrambler for scrambling said first code symbol subset according to a first code symbol rate, and said second modulator includes a second PN scrambler for scrambling said second code symbol subset according to a second code symbol rate.

* * * * *